(12) United States Patent
Marina et al.

(10) Patent No.: US 6,565,737 B2
(45) Date of Patent: May 20, 2003

(54) METHOD AND APPARATUS FOR SELECTIVELY REMOVING OXYGEN USING A NON-CATALYTIC ELECTRODE IN AN ELECTROCHEMICAL CELL

(75) Inventors: Olga A. Marina, Richland, WA (US); Craig F. Habeger, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 121 days.

(21) Appl. No.: 09/741,223

(22) Filed: Dec. 14, 2000

(65) Prior Publication Data

US 2002/0108863 A1 Aug. 15, 2002

(51) Int. Cl.$^7$ .............................................. G01N 27/41
(52) U.S. Cl. ...................... 205/765; 205/781; 204/252; 204/421; 204/424; 204/425; 204/426; 204/431
(58) Field of Search ................................. 205/765, 781; 204/252, 421, 424, 425, 426, 431, 432

(56) References Cited

U.S. PATENT DOCUMENTS

| | | |
|---|---|---|
| 3,522,097 A | 7/1970 | Tedmon, Jr. et al. |
| 5,034,112 A | 7/1991 | Murase et al. |
| 5,306,411 A | 4/1994 | Mazanec et al. |
| 5,397,442 A | 3/1995 | Wachsman |
| 5,554,269 A | 9/1996 | Joseph et al. |
| 5,643,429 A | 7/1997 | Wachsman |
| 5,800,783 A | 9/1998 | Nanaumi et al. .............. 422/94 |
| 5,879,526 A | 3/1999 | Dietz et al. .................. 204/425 |
| 5,897,759 A | 4/1999 | Kurosawa et al. ........... 204/424 |
| 5,910,238 A * | 6/1999 | Cable et al. .................. 205/765 |
| 6,019,881 A | 2/2000 | Kurosawa et al. ........... 204/424 |

FOREIGN PATENT DOCUMENTS

WO    WO 99/45607    9/1999

OTHER PUBLICATIONS

Norio Miura, Geyu Lu, Noboru Yamazoe; "High Temperature Potentiometric/Ampero Metric No$_x$ Sensors Combining Stabilized Zirconia With Mixed Metal Oxide Electrode" *Elsevier Sensors & Actuators*, May 11, 1998, pp. 169–178, vol. 52.

* cited by examiner

Primary Examiner—Arun S. Phasge
(74) Attorney, Agent, or Firm—Stephen R. May; Douglas E. McKinley, Jr.

(57) ABSTRACT

A method and apparatus for selectively removing oxygen from a gas stream containing NO$_x$ and oxygen by contacting the gas stream with an electrochemical cell made from an electrode consisting of La$_{1-x}$M$_x$FeO$_3$, (where M is selected from the group consisting of Sr, Ba, Ca, and combinations thereof, and X is between 0.05 and 0.5), a solid oxide electrolyte and a counter electrode, wherein the La$_{1-x}$M$_x$FeO$_3$ electrode is on one side of a solid oxide electrolyte, and a counter electrode is on the opposite side of the solid oxide electrolyte, and applying a voltage to the electrochemical cell. The apparatus is preferably employed in a two chambered NO$_x$ sensor utilizing solid electrolyte electrochemical cells, wherein an electrochemical cell capable of catalyzing oxygen reduction without catalyzing NO$_x$ decomposition is formed as integral to the first chamber.

13 Claims, 1 Drawing Sheet

Current-voltage curves of La$_{0.8}$Sr$_{0.2}$FeO$_3$ (LaBaFeO3) and La$_{0.8}$Sr$_{0.2}$FeO$_3$ (LaSrFeO3) electrodes obtained in NO$_X$+N$_2$ (475 ppm NOx) versus Ag/air electrode at 800°C.

Current-voltage curves of $La_{0.8}Sr_{0.2}FeO_3$ (LaBaFeO3) and $La_{0.8}Sr_{0.2}FeO_3$ (LaSrFeO3) electrodes obtained in $NO_X+N_2$ (475 ppm NOx) versus Ag/air electrode at 800°C.

METHOD AND APPARATUS FOR SELECTIVELY REMOVING OXYGEN USING A NON-CATALYTIC ELECTRODE IN AN ELECTROCHEMICAL CELL

FIELD OF THE INVENTION

The present invention relates generally to an electrochemical cell and the use of the electrochemical cell. More specifically, the present invention relates to an improved electrochemical cell that is useful in selectively removing oxygen from a gas stream without decomposing $NO_x$ and particularly useful when employed in a $NO_x$ sensor.

BACKGROUND OF THE INVENTION

Depending on how they are run, internal combustion engines that use air as an oxidant are going to produce some amount of $NO_x$. Large amounts of $NO_x$ emitted from internal combustion engines have proven to be a significant hazard to human health and to the quality of the environment. At the same time, the near ubiquitous presence of internal combustion engines throughout the industrial world insures that they will be a significant feature of every modern industrial society for at least the immediate future. Thus, if human health and environmental quality are to be preserved, internal combustion engines must be engineered to minimize the amount of $NO_x$ emissions.

To compel manufacturers to engineer their products to protect human health and environmental quality, regulatory agencies have imposed standards for $NO_x$ emissions that set forth the maximum levels that are permissible from a particular source. As more and more internal combustion engines are operated in ever smaller geographical boundaries, these standards are destined to grow more and more stringent if the overall goal of pollution reduction is to be achieved. To meet these standards, gasoline and diesel engine manufactures must build engines with the ability to adjust their own operation, to optimize the exhaust gas mix. Key to this ability is real time knowledge of the amount $NO_x$ being generated by the engine. Thus, the development of improved $NO_x$ sensors is critical to developing engines which can meet evolving, tough emissions standards that are in turn key to a healthy environment.

Due to their sensitivity, thermal stability, the ease with which they may be tested and manufactured, and the developed base technology, compact solid electrolyte $NO_x$ sensors are of particular interest to designers. Compared to nitrate-based metal salts or binary systems as an auxiliary phase, solid oxide electrolytes bring in high chemical and thermal stability.

A typical sensor utilizing a solid electrolyte consists of a two serial chambered system. The exhaust gas from an internal combustion engine (NO, $NO_2$, CO, $CO_2$, $SO_2$, $O_2$, hydrocarbons, etc.) enters the first chamber configured as an oxygen pump and the coexisting oxygen is removed via the YSZ solid electrolyte according to equation (1):

$$O_2 + 4e^- = 2O^{2-} \qquad (1)$$

The remainder of the gas diffuses into a second chamber where the $NO_x$ is decomposed electrochemically to $N_2$ and $O^{2-}$ on another electrode according to equations (2) and (3):

$$NO_2 + 2e^- = NO + O^{2-} \qquad (2)$$

$$2NO + 4e^- = N_2 + 2O^{2-} \qquad (3)$$

The current drawn in the second chamber is proportional to the amount of $NO_x$ since the only oxygen, in theory, passing through the electrolyte is formed during $NO_x$ decomposition. Therefore, there is a great need for a first-chamber electrode, which is capable of catalyzing oxygen reduction (reaction 1) without catalyzing $NO_x$ decomposition (reactions 2 and 3). The desire to improve the operation of such systems creates a need for an electrochemical cell that is capable of catalyzing oxygen reduction (reaction 1) without catalyzing $NO_x$ decomposition (reactions 2 and 3). As will be apparent to those having skill in the art, such a material is generally desirable in any system wherein it is desirable to remove oxygen from a gas stream containing oxygen and $NO_x$ and is particularly desirable as an electrochemical cell utilized in the first chamber of a two chamber $NO_x$ sensor that utilized solid electrolyte electrochemical cells.

SUMMARY OF THE INVENTION

Accordingly, the present invention is broadly drawn to an electrochemical cell and the use of the electrochemical cell to selectively remove oxygen from a gas stream without decomposing NOx. This aspect of the present invention provides particular utility when the present invention is employed in a $NO_x$ sensor. More particularly, an especially useful aspect of the present invention is found when the present invention is employed in a two chambered $NO_x$ sensor utilizing solid electrolyte electrochemical cells, wherein the present invention is employed as forming at least a part of the surface of the first chamber, thereby providing an electrochemical cell on the surface of the first chamber capable of catalyzing oxygen reduction without catalyzing NOx decomposition.

The electrochemical cell consists of a solid oxide electrolyte sandwiched between a working, or positive, electrode and a counter, or negative, electrode. The working electrode consists of $La_{1-x}M_xFeO_3$, where M is selected from the group consisting of Sr, Ba, Ca, and combinations thereof, and X is between 0.05 and 0.5, but preferably is about 0.2. The counter electrode may be any conductive material, but is preferably is a metal stable in air at the operating temperatures of the electrochemical cell. The electrolyte is an oxide with sufficient oxygen ion conductivity, preferably an $MO_x$-stabilized zirconia, where M is Y, Sc, Yb or Ca. By applying a current to the working electrode, and placing it in contact with a gas containing oxygen and $NO_x$, oxygen is selectively reduced (equation 1) and thereby removed from the gas stream through the electrolyte, while $NO_x$ concentration is unchanged.

OBJECTS

Accordingly, it is an object of the present invention to provide a method of selectively removing oxygen from a gas stream containing $NO_x$ and oxygen by contacting the gas stream with an electrochemical cell made from an electrode consisting of $La_{1-x}M_xFeO_3$, (where M is selected from the group consisting of Sr, Ba, Ca, and combinations thereof, and X is between 0.05 and 0.5), wherein the electrode is on one side of a solid oxide electrolyte, and a counter electrode is on the opposite side of the solid oxide electrolyte, and applying a voltage to the electrochemical cell.

It is a further object of the present invention to provide the counter electrode as a metal.

It is a further object of the present invention to provide the counter electrode as a metal stable in air at the operating temperatures of the electrochemical cell.

It is a further object of the present invention to provide an electrochemical cell for selectively removing oxygen from a gas stream containing $NO_x$ and oxygen as an electrode consisting of $La_{1-x}M_xFeO_3$, (where M is selected from the group consisting of Sr, Ba, Ca, and combinations thereof, and X is between 0.05 and 0.5), and the electrode is affixed to one side of a solid oxide electrolyte, and a counter electrode affixed to the opposite side of the solid oxide electrolyte.

It is a further object of the present invention to provide an improved two chambered $NO_x$ sensor utilizing solid oxide electrolyte electrochemical cells, wherein an electrochemical cell capable of catalyzing oxygen reduction without catalyzing $NO_x$ decomposition is integral to the first chamber.

It is a further object of the present invention to provide an improved $NO_x$ sensor having an electrochemical cell fashioned of a porous electrode consisting of $La_{1-x}M_xFeO_3$, (where M is selected from the group consisting of Sr, Ba, Ca, and combinations thereof, and X is between 0.05 and 0.5,) the electrode being affixed to one side of a solid oxide electrolyte, and a counter electrode affixed to the opposite side of the solid oxide electrolyte.

These and other objects of the present invention are particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
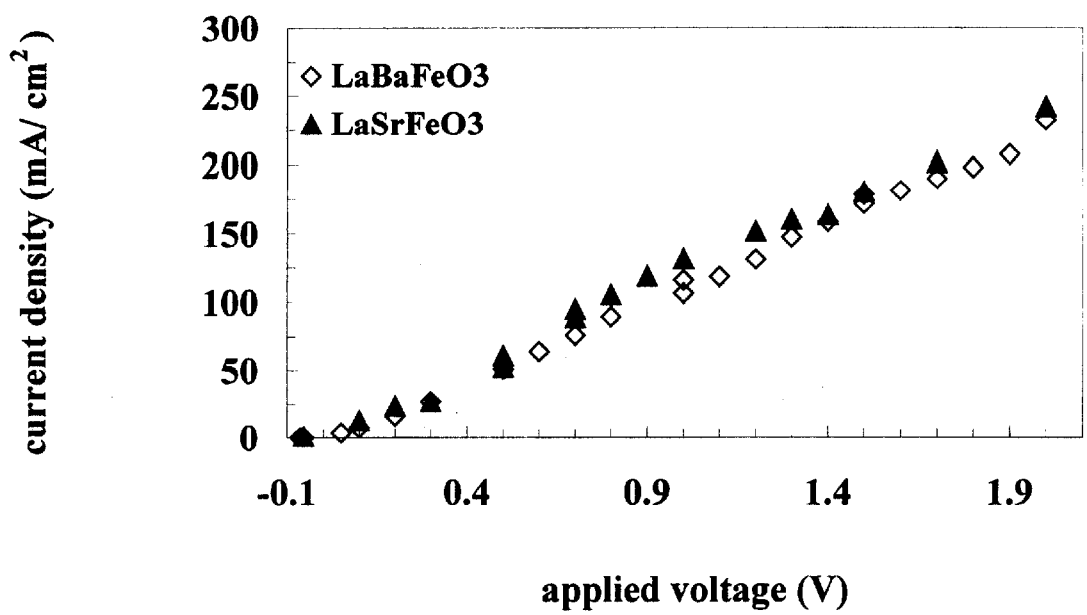
FIG. 1. is a graph showing the current-voltage curves of an experimental apparatus set up to demonstrate the basic electrochemical operation of the present invention. Data were obtained in $NOx+N_2$ with a $NO_x$ concentration of 475 ppm vs. Ag/air electrode at 800° C. $La_{1-x}M_xFeO_3$=$La_{0.8}Sr_{0.2}FeO_3$ and LBF=$La_{0.8}Ba_{0.2}FeO_3$.

An experiment was undertaken to demonstrate the basic electrochemical properties of the present invention. $La_{1-x}M_xFeO_3$ perovskites were synthesized from mixed nitrate solutions by the glycine-nitrate process using a stoichiometric fuel/oxidant ratio. Powders were calcined in air at 830° C. for 2 h. The electrode inks were produced by mixing with the binder followed by roll-milling. 8 mole % yttria-doped zirconia (YSZ) discs sintered at 1530° C. for 2 h were used as the electrolytes. The electrode inks were screen-printed on the electrolyte discs and fired at 1240° C. for 2 h in air to obtain a working electrode. The electrodes were porous with a thickness of ca. 25 $\mu$m. Silver paste grids were screen-printed on their top to ensure proper current collection. A geometrical surface area of the electrodes was 2 $cm^2$. Silver paste counter electrodes were screen-printed symmetrically on the opposite side of the YSZ discs. The YSZ pellet with two electrodes was attached to an alumina tube with high- temperature cement. A working electrode was positioned inside the tube and was fed with a mixture of $NO_x$ and nitrogen. A counter electrode was outside the tube and was exposed to air. Both electrodes were provided with platinum wire current collectors and fired at 830–850° C. for 2h before testing.

Testing of the catalytic activity of ferrites towards $NO_x$ decomposition was performed in the two-atmosphere as described herein. The following electrochemical cells were tested:

$N_2+NO_x$, Ag|YSZ|Ag, air $N_2+NO_x$, $La_{0.8}Sr_{0.2}FeO_3$ (with a Ag current collector) |YSZ|Ag, air $N_2+NO_x$, $La_{0.8}Ba_{0.2}FeO_3$ (with Ag current collector) |YSZ|Ag, air.

The Ag electrode was inert for $NO_x$ decomposition. Silver paste was used to ensure the proper current collection from the working electrode. Analysis of the gas mixture was carried out by Magna IR spectrometer (Nicolet). Partial pressures of $NO_x$ gases were controlled before the electrochemical cell, after the cell under the open-circuit conditions and when potential was applied to the electrode.

As given in Table 1, $La_{0.8}Sr_{0.2}FeO_3$ and $La_{0.8}Ba_{0.2}FeO_3$ electrodes were practically inert towards $NO_x$. NO conversion was lower than 2%.

TABLE 1

Conversion (%) of $NO_x$ at 800° C. on $La_{0.8}M_2FeO_3$ under open-circuit voltage (OCV) and at given applied voltage (V).

| Electrode | OCV*, V | 0.5 V | 1.0 V | 1.5 V |
|---|---|---|---|---|
| $La_{0.8}Sr_{0.2}FeO_3$ | 0.9 | 1.4 | 2.0 | 1.4 |
| $La_{0.8}Ba_{0.2}FeO_3$ | 0 | 0.2 | 0.4 | 0.6 |

*Open Circuit Voltage (OCV) is −52 ÷ 64 mV.

The polarization characteristics of the electrodes tested in $NO_x$ are given in FIG. 1. Voltage corresponds to the applied potential and is not corrected for ohmic polarization of the electrolyte. $La_{0.8}Sr_{0.2}FeO_3$ and $La_{0.8}Ba_{0.2}FeO_3$ electrodes exhibited rather similar performance. While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of selectively removing oxygen from a gas stream containing $NO_x$ and oxygen comprising the steps of:
   a) contacting the gas stream with an electrochemical cell comprising an electrode consisting of $La_{1-x}M_xFeO_3$, where M is selected from the group consisting of Sr, Ba, Ca, and combinations thereof, and X is between 0.05 and 0.5, wherein the electrode is on one side of a solid oxide electrolyte, and wherein a counter electrode is on the opposite side of the solid oxide electrolyte, and
   b) applying a voltage to the electrochemical cell.

2. The method of claim 1 wherein said counter electrode is a metal stable in air at the operating temperature of the electrochemical cell.

3. The method of claim 1 wherein X is about 0.2.

4. The method of claim 1 wherein the solid oxide electrolyte is provided as stabilized zirconia.

5. An electrochemical cell for selectively removing oxygen from a gas stream containing $NO_x$ and oxygen comprising:
   a) an electrode consisting of $La_{1-x}M_xFeO_3$, where M is selected from the group consisting of Sr, Ba, Ca, and combinations thereof, and X is between 0.05 and 0.5,
   b) the electrode being affixed to one side of a solid oxide electrolyte,
   c) a counter electrode affixed to the opposite side of the solid oxide electrolyte.

6. The electrochemical cell of claim 5 wherein the counter electrode is a metal stable in air at the operating temperature of the electrochemical cell.

7. The electrochemical cell of claim 5 wherein X is about 0.2.

8. The electrochemical cell of claim 5 wherein the solid oxide electrolyte is stabilized zirconia.

9. An improvement to a two chambered $NO_x$ sensor utilizing solid electrolyte electrochemical cells, the improvement comprising forming an electrochemical cell with an electrode capable of catalyzing oxygen reduction without catalyzing $NO_x$ decomposition as integral to the first chamber of the two chambered $NO_x$ sensor.

10. The improved $NO_x$ sensor of claim 9 wherein said electrochemical cell comprises:

a) an electrode consisting of $La_{1-x}M_xFeO_3$, where M is selected from the group consisting of Sr, Ba, Ca, and combinations thereof, and X is between 0.05 and 0.5, b) the electrode being affixed to one side of a solid oxide electrolyte, and c) a counter electrode affixed to the opposite side of the solid oxide electrolyte.

11. The improved $NO_x$ sensor of claim 10 wherein said counter electrode is a metal stable in air at the operating temperature of the electrochemical cell.

12. The improved $NO_x$ sensor of claim 10 wherein X is about 0.2.

13. The electrochemical cell of claim 10 wherein the solid oxide electrolyte is stabilized zirconia.

* * * * *